us008850656B2

(12) United States Patent
Bernal et al.

(10) Patent No.: US 8,850,656 B2
(45) Date of Patent: Oct. 7, 2014

(54) CASTOR ASSEMBLY FOR A MODULAR DOLLY

(71) Applicants: Andres Bernal, Sunny Isles, FL (US); Luca Buttazzoni, Miami, FL (US)

(72) Inventors: Andres Bernal, Sunny Isles, FL (US); Luca Buttazzoni, Miami, FL (US)

(73) Assignee: Luca Buttazzoni, Miami, FL (US)

( * ) Notice: Subject to any disclaimer, the term of this patent is extended or adjusted under 35 U.S.C. 154(b) by 0 days.

(21) Appl. No.: 13/755,542

(22) Filed: Jan. 31, 2013

(65) Prior Publication Data

US 2013/0341880 A1    Dec. 26, 2013

Related U.S. Application Data

(63) Continuation-in-part of application No. 13/533,874, filed on Jun. 26, 2012, now Pat. No. 8,684,372.

(51) Int. Cl.
| | | |
|---|---|---|
| *B60B 33/08* | (2006.01) | |
| *B62B 3/02* | (2006.01) | |
| *B60B 33/00* | (2006.01) | |
| *B62B 5/00* | (2006.01) | |

(52) U.S. Cl.
CPC ........... *B60B 33/00* (2013.01); *B62B 2301/252* (2013.01); *B62B 2205/006* (2013.01); *B62B 3/02* (2013.01); *B60B 33/08* (2013.01); *B62B 2206/04* (2013.01); *B60B 33/0026* (2013.01); *B60B 33/001* (2013.01); *B62B 5/0093* (2013.01)
USPC ................................................. 16/24; 16/30

(58) Field of Classification Search
CPC  B60B 33/08; B60B 33/0002; B60B 33/0028; B60B 33/0005; B60B 33/0018; A47B 91/06; A47B 91/12
USPC .......... 16/35 R, 26, 30, 34, 43, 18 A; 280/32, 280/32.6, 29, 11.226, 42, 647, 651; 248/129, 188.9, 188.8, 188, 188.1, 248/188.2
See application file for complete search history.

(56) References Cited

U.S. PATENT DOCUMENTS

| | | |
|---|---|---|
| 123,147 A | 1/1872 | Blackman |
| 189,531 A | 4/1877 | Voorhees |
| 208,650 A | 10/1878 | Tucker |
| 217,172 A | 7/1879 | Tucker |
| RE9,283 E | 7/1880 | Woodruff |
| 378,135 A | 2/1888 | Hess |
| 442,825 A | 12/1890 | Randall |
| 444,020 A | 1/1891 | Rogers et al. |

(Continued)

FOREIGN PATENT DOCUMENTS

| | | | |
|---|---|---|---|
| GB | 2423012 A | * | 8/2006 |
| JP | 06293201 A | * | 10/1994 |

*Primary Examiner* — Chuck Mah
(74) *Attorney, Agent, or Firm* — Malloy & Malloy, P.L.

(57) ABSTRACT

A castor assembly structured for use in combination with or independently of a dolly or other support platform including a one piece base comprising a housing and a head integrally connected to the housing and extending radially outward from one end thereof. The housing includes an open interior and a open end structured to movably retain a surface engaging roller ball therein. A retaining portion may be formed on said base in cooperative relation with said head so as to secure a support platform to the base when in a first operative position. A second operative position comprises said head disposed in engagable and at least partially supporting relation to an object while the base is not secured to or used in combination with a dolly or other support platform.

20 Claims, 20 Drawing Sheets

(56) References Cited

U.S. PATENT DOCUMENTS

| | | | | |
|---|---|---|---|---|
| 520,319 | A | 5/1894 | Kynoch | |
| 525,298 | A | 8/1894 | Thiele et al. | |
| 600,172 | A | 3/1898 | Rechtsteiner | |
| 843,234 | A | 2/1907 | Rawlinson | |
| 970,386 | A | 9/1910 | Nickerson | |
| 1,265,850 | A | 5/1918 | Wierszewska | |
| 1,461,027 | A | 7/1923 | Brockson | |
| 1,508,232 | A | 9/1924 | Milosy | |
| 1,887,067 | A | 11/1932 | Pehrsson | |
| 1,918,604 | A | 7/1933 | Johnson | |
| 1,942,112 | A | 1/1934 | McQuilkin | |
| 2,048,608 | A | 7/1936 | Holland | |
| 2,186,368 | A | 1/1940 | Conger | |
| 2,423,711 | A * | 7/1947 | Knox | 16/26 |
| 2,490,879 | A * | 12/1949 | Milich | 16/26 |
| 2,500,215 | A | 3/1950 | Swearingen | |
| 2,534,367 | A | 12/1950 | Perrotta et al. | |
| 2,654,421 | A | 10/1953 | Neff | |
| 2,661,220 | A | 12/1953 | Davis | |
| D177,208 | S | 3/1956 | Berlin | |
| 2,830,824 | A | 4/1958 | Young | |
| 2,849,241 | A | 8/1958 | Owen | |
| 3,007,710 | A | 11/1961 | Sykes | |
| 3,285,447 | A | 11/1966 | Junion | |
| 3,329,442 | A | 7/1967 | Di Vietri | |
| 3,367,675 | A | 2/1968 | Gearin | |
| 3,389,421 | A * | 6/1968 | Wheeler | 16/42 R |
| 3,522,951 | A | 8/1970 | Tyson | |
| 3,559,802 | A | 2/1971 | Eidus | |
| 3,577,620 | A * | 5/1971 | Hoffman et al. | 29/898.062 |
| 3,802,717 | A | 4/1974 | Eitreim | |
| 3,831,959 | A | 8/1974 | Fontana | |
| 3,871,676 | A | 3/1975 | Renard et al. | |
| 3,923,318 | A | 12/1975 | Renard et al. | |
| 3,963,256 | A | 6/1976 | Stafford | |
| 3,964,762 | A | 6/1976 | Adams | |
| 3,983,821 | A | 10/1976 | Kearns | |
| 4,178,006 | A | 12/1979 | Johnson | |
| 4,274,644 | A | 6/1981 | Taylor | |
| 4,285,550 | A * | 8/1981 | Blackburn et al. | 384/49 |
| 4,381,054 | A | 4/1983 | Rumpel | |
| 4,382,637 | A * | 5/1983 | Blackburn et al. | 384/49 |
| 4,392,665 | A | 7/1983 | Miller et al. | |
| 4,402,506 | A | 9/1983 | Jones | |
| 4,576,389 | A | 3/1986 | Villaveces et al. | |
| 4,647,056 | A | 3/1987 | Baker | |
| 4,725,028 | A | 2/1988 | Conradt | |
| 4,743,039 | A | 5/1988 | Ellis | |
| 4,778,041 | A * | 10/1988 | Blaurock | 193/35 MD |
| 4,799,288 | A * | 1/1989 | Kimizawa | 16/2.1 |
| 4,969,657 | A | 11/1990 | Kaufmann | |
| 4,996,738 | A * | 3/1991 | Tifre | 16/26 |
| 5,144,708 | A | 9/1992 | Pekar | |
| 5,219,058 | A * | 6/1993 | Sundseth | 193/35 MD |
| 5,230,408 | A | 7/1993 | Sadow | |
| 5,379,485 | A | 1/1995 | Oshins et al. | |
| 5,393,079 | A | 2/1995 | Wang | |
| 5,564,143 | A | 10/1996 | Pekar et al. | |
| 5,599,031 | A | 2/1997 | Hodges | |
| 5,726,368 | A | 3/1998 | Shaw | |
| 5,737,801 | A * | 4/1998 | Flood | 16/30 |
| 6,038,734 | A | 3/2000 | Facchin | |
| 6,095,534 | A | 8/2000 | Wong | |
| 6,134,747 | A * | 10/2000 | Leibman | 16/24 |
| 6,179,374 | B1 | 1/2001 | Tang | |
| 6,382,643 | B1 | 5/2002 | Baker | |
| 6,419,198 | B1 | 7/2002 | Einav | |
| 6,491,318 | B1 | 12/2002 | Galt et al. | |
| 6,772,478 | B2 | 8/2004 | Herder et al. | |
| 6,776,382 | B1 | 8/2004 | Papadopoulos et al. | |
| 6,942,605 | B1 | 9/2005 | Sukhovitsky | |
| 6,964,423 | B1 | 11/2005 | Chieh et al. | |
| 7,036,161 | B2 | 5/2006 | Harrison et al. | |
| 7,055,847 | B2 | 6/2006 | Miller et al. | |
| 7,188,859 | B2 | 3/2007 | Hardin et al. | |
| 7,305,737 | B2 * | 12/2007 | Libakken | 16/35 R |
| 7,421,956 | B1 | 9/2008 | McCarthy et al. | |
| 7,478,835 | B2 | 1/2009 | Autenrieth | |
| 7,547,037 | B2 | 6/2009 | Poppinga et al. | |
| 7,621,858 | B2 | 11/2009 | Sheron | |
| 8,011,686 | B2 | 9/2011 | Chen et al. | |
| 8,096,566 | B2 | 1/2012 | West | |
| 8,205,841 | B2 | 6/2012 | Wood | |
| 8,220,824 | B2 | 7/2012 | Chen et al. | |
| 2003/0155389 | A1 | 8/2003 | Swartzentruber | |
| 2004/0173996 | A1 | 9/2004 | Anderson | |
| 2005/0211862 | A1 | 9/2005 | Autenrieth | |
| 2006/0097468 | A1 | 5/2006 | Sugrue | |
| 2006/0279054 | A1 | 12/2006 | Chung et al. | |
| 2007/0029747 | A1 | 2/2007 | Islo et al. | |
| 2009/0167008 | A1 | 7/2009 | Autenrieth | |
| 2009/0178821 | A1 | 7/2009 | Zavidniak et al. | |
| 2009/0184482 | A1 | 7/2009 | Scott | |
| 2009/0212514 | A1 | 8/2009 | Moorman, Jr. | |
| 2012/0087216 | A1 | 4/2012 | Keung et al. | |

* cited by examiner

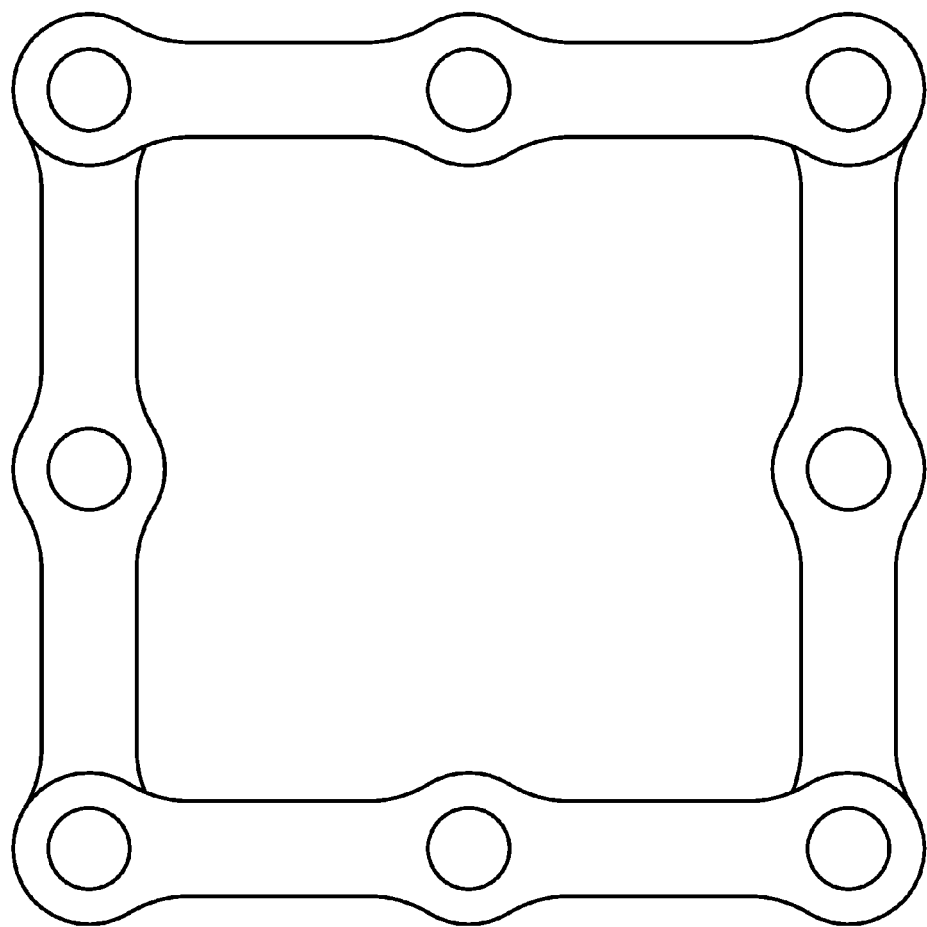
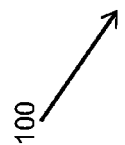
Fig. 11

100

100

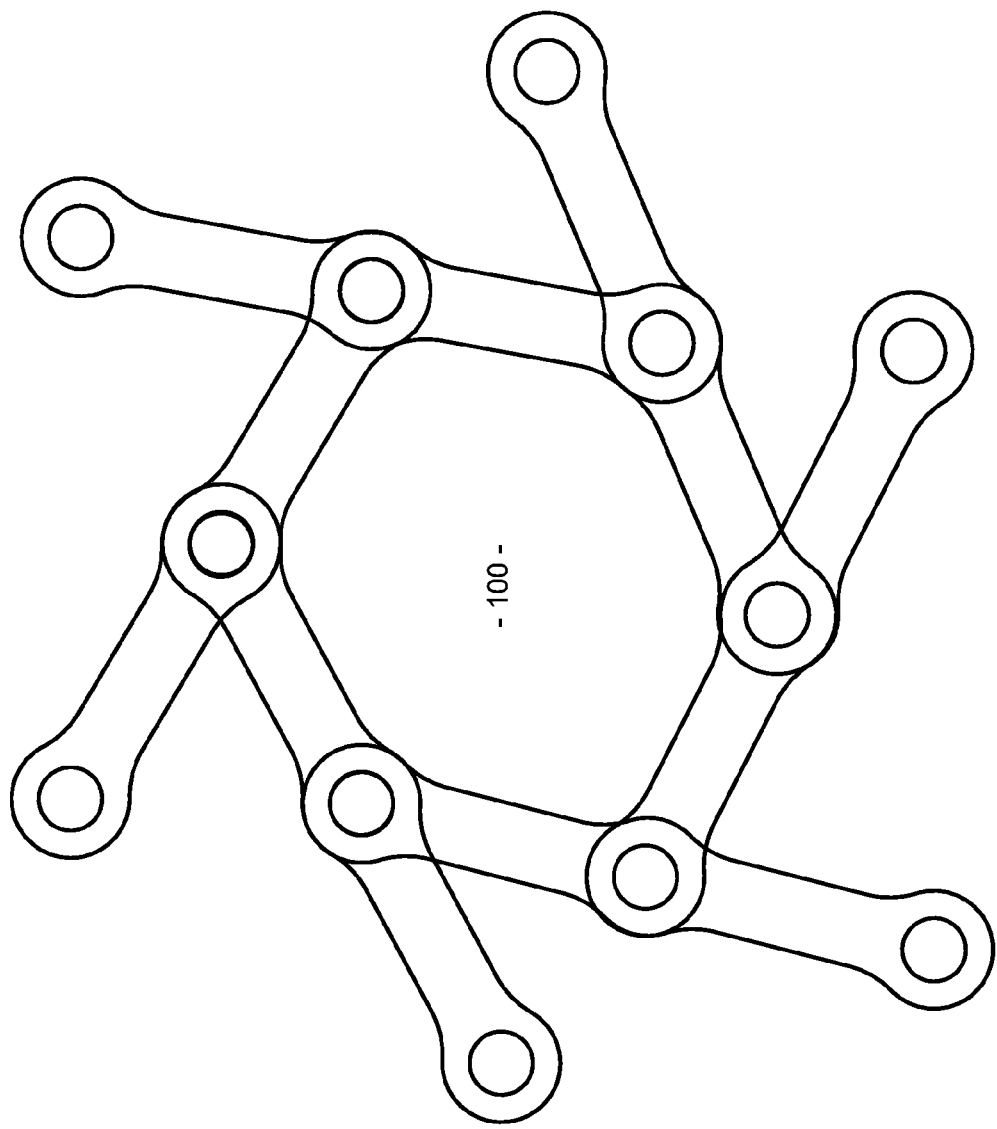

CASTOR ASSEMBLY FOR A MODULAR DOLLY

CLAIM OF PRIORITY

The present application is a continuation-in-part application of previously filed application having Ser. No. 13/533,874, filed on Jun. 26, 2012 incorporated herein by reference.

BACKGROUND OF THE INVENTION

1. Field of the Invention

The present invention is directed to a castor assembly, which in at least one embodiment includes a one piece construction, having structural and operative features which facilitate its use in a first operative position, in combination with a dolly or other support platform. Alternatively, the castor assembly is capable of being used in a second operative position independently of a dolly or support platform, but possibly with one or more additional castor assemblies, to support an object. The castor assembly includes a base having a head and an integrally or fixedly connected housing having an open interior and an open distal end collectively dimensioned to movably retain a movable support, preferably comprising a roller ball, therein.

2. Description of the Related Art

The use of dolly structures is quite common for different applications and across a variety of different industries. As such, dolly structures can be generally categorized as platform dollies, hand trucks, mobile carts, etc. In each instance, these different types of dollies are intended for use in movably supporting different types of objects over various surfaces, and further, the objects being movably supported may vary in weight, size, configuration, etc. Therefore, the selection of a particular type of dolly will usually depend on the physical characteristics of the object with which the dolly is intended to be used.

By way of example, platform dollies usually have a relatively large platform supported by a plurality of wheels, rollers, castors, etc., which are fixedly secured to the under portion of the platform. In contrast, hand trucks normally comprise an elongated, vertically extending, upper portion attached to a lower portion having an outwardly extending supporting platform. As with platform dollies, the hand truck usually includes fixedly or permanently attached wheels connected generally at the junction of the upper and lower portions. Somewhat similarly, movable carts for supporting one or more objects of different weights may also be considered a dolly structure. Weight supporting carts normally include a supporting base and a retaining structure associated therewith in a manner which facilitates the movable support of one or more different objects. Similar to the other dollies noted herein, these cart types of dollies also normally include a plurality of wheels, rollers, castors, etc. which are fixedly attached to the cart.

Importantly, however, each of the above noted types of dolly structures is typically fixed in their configuration and not structured to be reduced in size, such as by being collapsed or at least partially disposed into a folded, reduced size configuration, which would facilitate storage, transportation and overall handling thereof, when the dolly structure is not being used.

Therefore, problems and disadvantages associated with known or conventional dolly structures typically include their inability to be disposed into a collapsed or reduced size orientation when not in use. Further, it is generally acknowledged that prior art dolly structures may be configured to movably support a variety of different articles. However, a prominent consideration in the design and structuring of conventional dollies is the weight, size and shape of the devices being supported. In turn such considerations will most probably affect the size, configuration of and overall weight bearing abilities of the dolly being used. By way of example, large platform dollies are generally intended to accommodate large and/or relatively heavy devices which may also have a bulking shape or configuration. Accordingly, dollies of this type are not easily collapsed or reduced in size to facilitate the aforementioned storage or transport when not in use.

In turn, lighter weight or smaller dolly structures including, but not limited to, cart type dollies and hand trucks may be structured to movably support smaller relatively lighter loads than the aforementioned platform dollies. As a result these type of dollies may include at least some adjustable features or components in order to facilitate the handling thereof. However, such adjustable features may be only minimally operative to significantly reduce the size and configuration thereof. As a result, dollies of this type are not normally structured to be disposed in a sufficiently collapsed orientation, of sufficiently reduced size and configuration, to permit their efficient and effective storage, transport, etc., either individually of collectively.

Therefore, there is a need in the area associated with the design and manufacture of dollies or other movable support platforms for a castor assembly capable of being used in combination with or independently of a dolly assembly to movably support any of a variety of different objects. Accordingly a proposed castor assembly could include a one piece construction having structural and operative features which facilitate its use in a first operative position, in combination with a dolly or other support platform. Alternatively, the castor assembly is capable of being used in a second operative position independently of a dolly or support platform, but possibly with one or more like castor assemblies, to support an object.

Moreover, the proposed castor assembly can be used to movably support objects which may significantly differ in size, shape or weight. More specifically, when used in the first operative position, the dolly or support platform used in combination with the proposed dolly assembly can be increased or decreased in size by virtue of a pivotal or other movable connection between the support platform and the one or more castor assemblies used therewith. Alternatively, when used in the second operative position, the number of castor assemblies and their locations on or relative to the supported object can be increased or decreased to accommodate the corresponding size, weight, etc. of the object(s) being movably supported.

SUMMARY OF THE INVENTION

The present invention is directed to a modular dolly assembly and one or more embodiments of a castor assembly which may be used with the modular dolly assembly, or with other type dolly assemblies or support platforms. As described hereinafter, the modular dolly assembly is easy to store, easy to assemble and disassemble, and easy to manipulate into desired shapes and sizes. The modular dolly assembly is also very inexpensive to manufacture and ship.

The modular dolly assembly of the present invention comprises at least one strut having a first and second end, and a first, second, and third through hole. For use in combination therewith, one embodiment of the castor assembly comprises at least one first connector; at least one second connector, each first connector removably attaches to each second connector and may be referred to herein as a connector assembly. After at least two struts have been modularly assembled, each connector assembly is threaded through either the first, second, or third through holes of each respective strut and at least one caster assembly, wherein each caster assembly removably attaches to each connector assembly.

In a further embodiment of the present invention, the modular dolly assembly may also comprise at least one termination. Each termination shall be placed at a desired end of the dolly and shall be locked in place by each connector assembly. Each termination is used to create either a pivot point at each end of the dolly assembly or to insert a handle or any other device needed to move the dolly from one location to another. Each termination may comprise a planar body that defines two termination through holes. One of the termination through holes may be irregularly shaped to accommodate a handle, a post connection, a belt, or any other device that may be used to push or pull the collapsible body into a desired shape. If using a post or a handle, the post or handle can also serve the purpose of containing any object on the surface area of the modular dolly.

The present invention addresses the need in the industry of modular dolly assemblies and castor assembly structures having the structural and operational versatility to be used with the modular dolly assembly, with other dolly assemblies or independently of any dolly assembly or like support platform.

An additional preferred embodiment of the present invention is directed to a one piece castor assembly which includes structural and operative features facilitating its use in combination with a support platform such as, but not limited to, the modular dolly assembly described herein or other type support platforms or dolly structures. Alternatively, the one piece castor assembly can be used independently of any type of support platform and/or dolly structure to engage and movably support any of a variety of objects independent of a support platform and/or castor assembly.

Accordingly, the one piece castor assembly of the additional preferred embodiment may assume a first operative position wherein it is connected to the modular dolly structure or other support platform. When so used, one or more objects are at least partially supported on the platform and possibly, at least partially, on one or more of the one piece castor assemblies movably connected to and supporting the dolly or other platform. A second operative position comprises the one piece castor assembly used separately and/or independently of any type of dolly structure or support platform. When used in the second operative position or orientation, one or more castor assemblies of the present invention are removably connected in supporting relation to the one or more objects so as to facilitate the movement of the supported object over any of a variety of different surfaces without using a dolly structure per se.

More specifically, the one piece castor assembly of the additional preferred embodiment includes a one piece base comprising a head and a housing integrally or otherwise fixedly secured to the head to define the one piece construction. The housing includes an open interior and an open end communicating therewith. The head preferably comprises a substantially flat and/or disk-like shape and is attached to the opposite end of the housing, relative to the open end. Further, the head is enlarged to the extent of extending radially outward from the housing. As such, the head has a greater diameter than the transverse dimension of the housing. Further, the head may be disposed, when in either the first or second operative positions, to engage and/or confront the object(s) being movably supported by a support platform and/or one or more of the castor assemblies. Movement of the castor assembly is accomplished through the provision of a roller ball disposed within the open interior of the housing and at least partially extending outwardly therefrom through the open end into engaging relation with the ground or other surface over which the castor assembly travels.

Additional structural features of the castor assembly include the housing comprising a plurality of housing segments or elongated legs preferably disposed in spaced relation to one another along at least a portion of their length and/or along at least a majority of their respective lengths. At least partially due to this spaced construction, the housing segments may demonstrate flexible characteristics allowing the open end to be temporarily enlarged or expanded in order to accommodate insertion and removable retention of the roller ball through the open end and into the open interior.

The castor assembly may include a retaining portion formed on the exterior of the base and structured to connect a dolly or other support platform to the base. When connected to a support platform in this manner, the castor assembly will be used in combination with the connected dolly or support platform and thereby be disposed in the aforementioned first operative position. It is to be noted that the retaining portion may be structured to removably retain the dolly or other support platform on the base, thereby facilitating the removal or detachment of the castor assembly therefrom. When so detached or otherwise not operatively associated with a support platform, one or more of the castor assemblies may be used, in the aforementioned second operative position, to movably support an object(s) independent of a dolly structure or support platform, by directly and preferably removably engaging or confronting an under portion of the object being supported.

In more specific terms, the retaining portion comprises a recess formed in the exterior or outer portion of the housing or other portion of the base, in cooperative relation to the head. The recess of the retaining portion is of a sufficient "depth" to have an engaged portion of the dolly or support platform removably disposed or retained therein. In addition, the recess and the head are cooperatively disposed on the base so as to collectively retain the support platform on the base. Therefore, the recess may be disposed immediately adjacent and/or contiguous to an under portion of the head, such that the under portion of the head will be in engaging or abutting relation to the support platform received within the recess of the retaining portion. As indicated, the housing may comprise the aforementioned plurality of spaced apart housing segments. In cooperative relation with this structural modification, the retaining portion may comprise a plurality of recess segments each formed in the outer surface or portion of a different one of the housing segments. As such, the recess segments collectively define the recess of the retaining portion.

As set forth above, the retaining portion is disposed adjacent and/or contiguous to the under portion of the enlarged head. Therefore, when the castor assembly of the present invention is disposed in the first operative position and used in combination with a dolly or other support platform, the housing portion of the base will be inserted through an appropriately sized hole, opening, passage, etc. in the support platform. Such insertion will serve to dispose a corresponding portion of the support platform within the aforementioned recess of the retaining portion. Concurrently, the under portion of the head will be disposed in confronting and/or engaging relation with the outer portion of the support platform and in covering or overlying relation to the portion thereof received within the recess of the retaining portion. The first operative position further comprises at least most of the housing extending through the platform and the open end and roller ball being disposed on the opposite side of the dolly or support platform relative to the head.

Therefore, the versatility of castor assembly is further demonstrated by the ability to use it in the first operative position or the second operative position. Moreover, when in the first operative position it can be used in combination with a variety of different dolly assemblies or other support platforms. As such, the castor assembly of the additional preferred embodiment may be used with a dolly assembly of the type including a plurality of movably interconnected modular struts, described in greater detail herein.

These and other objects, features and advantages of the present invention will become clearer when the drawings as well as the detailed description are taken into consideration.

BRIEF DESCRIPTION OF THE DRAWINGS

These and other features, aspects, and advantages of the present invention will become better understood with regard to the following description, appended claims, and drawings where:

FIG. 11 is a top plan view showing how the unique struts of the dolly assembly of embodiment of FIGS. 1-4 can be attached together to form a square weight bearing surface.

FIG. 15 is a top plan view showing how the unique struts of the dolly assembly of embodiment of FIGS. 1-4 can be attached together to form another irregularly shaped weight bearing surface.

Like reference numerals refer to like parts throughout the several views of the drawings.

DETAILED DESCRIPTION OF THE PREFERRED EMBODIMENT

Figure 1:
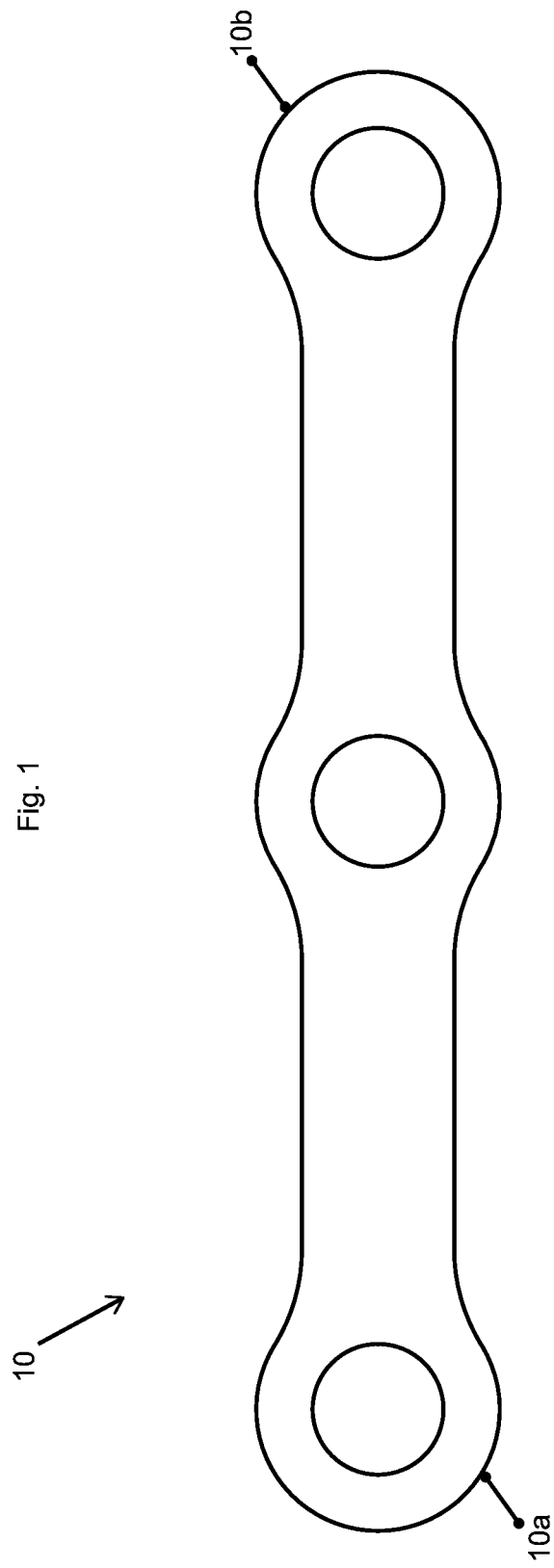
FIG. 1 is a top plan view of a modular strut representing at least a part of a dolly assembly with which a preferred castor assembly of the present invention may be used.
Figure 2:
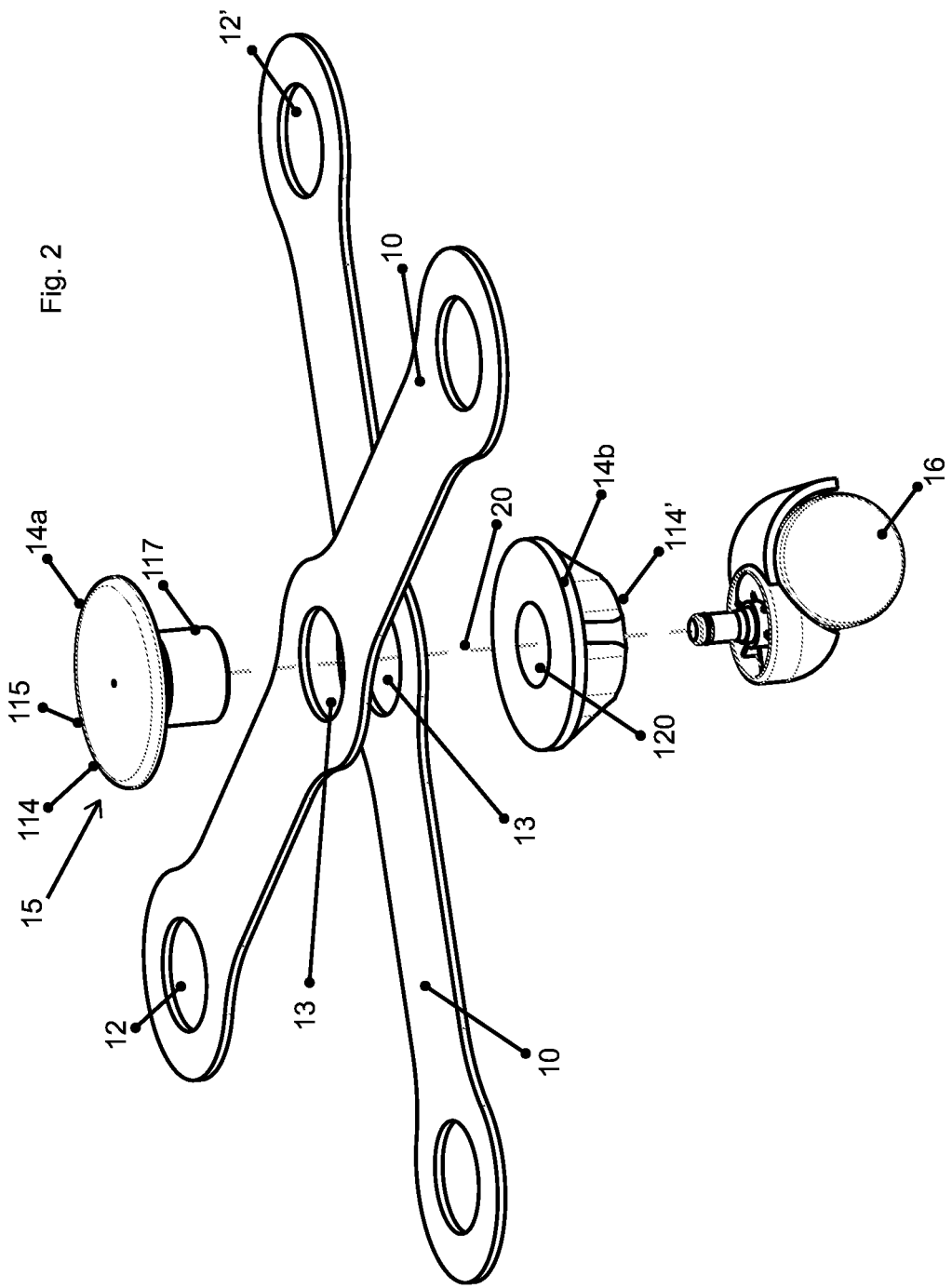
FIG. 2 is a perspective view in exploded from showing two struts of the present invention being assembled together.
Figure 3:
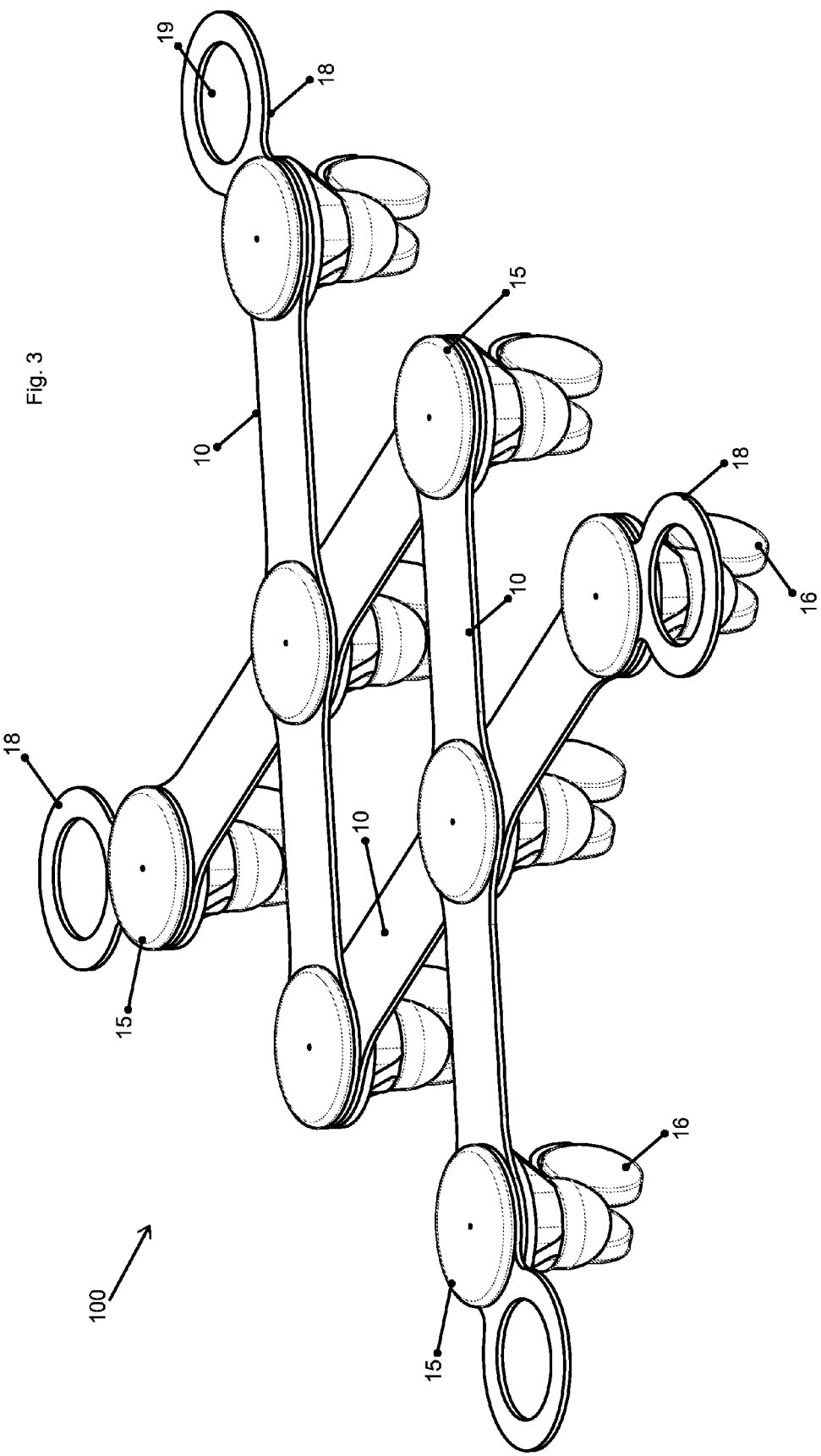
FIG. 3 is a perspective view showing the modular dolly assembly of FIGS. 1 and 2, in an expanded position, wherein four unique struts are used, eight connector assemblies are used, eight casters are used and four terminations are used.

As seen in FIGS. 1-3, a modular assembly for constructing a dolly assembly 100 comprises at least one strut 10 having a first end 10a and second end 10b, and a first 12, second 12, and third through hole 13; at least one first connector 14a; a least one second connector 14b, each first connector 14a removably attaches to each second connector 14b, hereinafter referred as a connector assembly 15, after at least two struts 10 have been modularly assembled, each connector assembly 15 is inserted or threaded through either the first 12, second 12, or third 13 through holes of each respective strut 10; and at least a movable support in the form of a castor structure 16 removably attached to each connector assembly 15. The first 12 and second 12 through holes of each strut 10 are formed adjacent to the first 10a and second 10b ends of each strut 10 respectively. Each third through hole 13 is intermediate and/or approximately equidistant to the first 12 and second 12 through holes of each strut 10.

Figure 6:
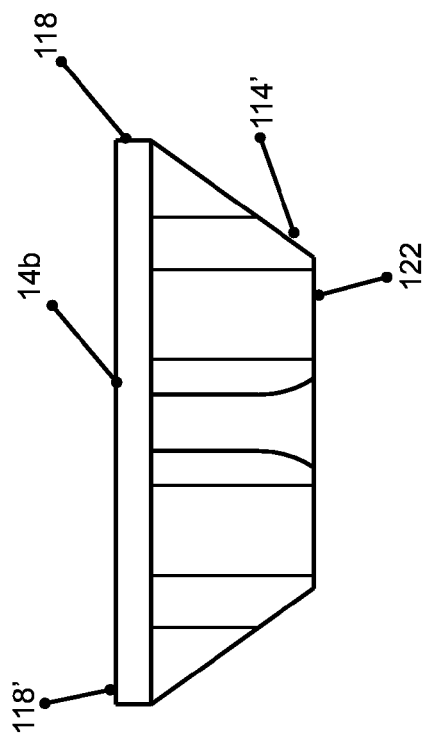
FIG. 6 is a perspective view showing a second connector of the connector assembly of the embodiment of FIGS. 1-4.
Figure 5:
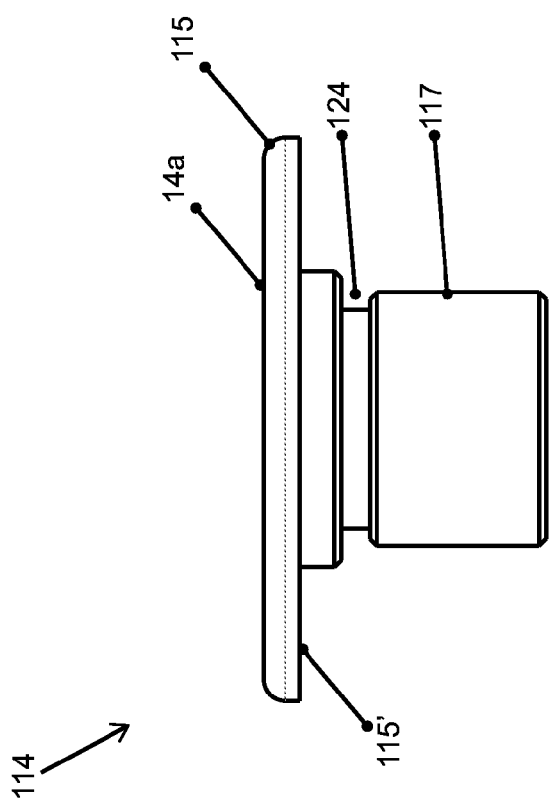
FIG. 5 is a perspective view showing a first connector of the connector assembly of the embodiment of FIGS. 1-4.
Figure 7:
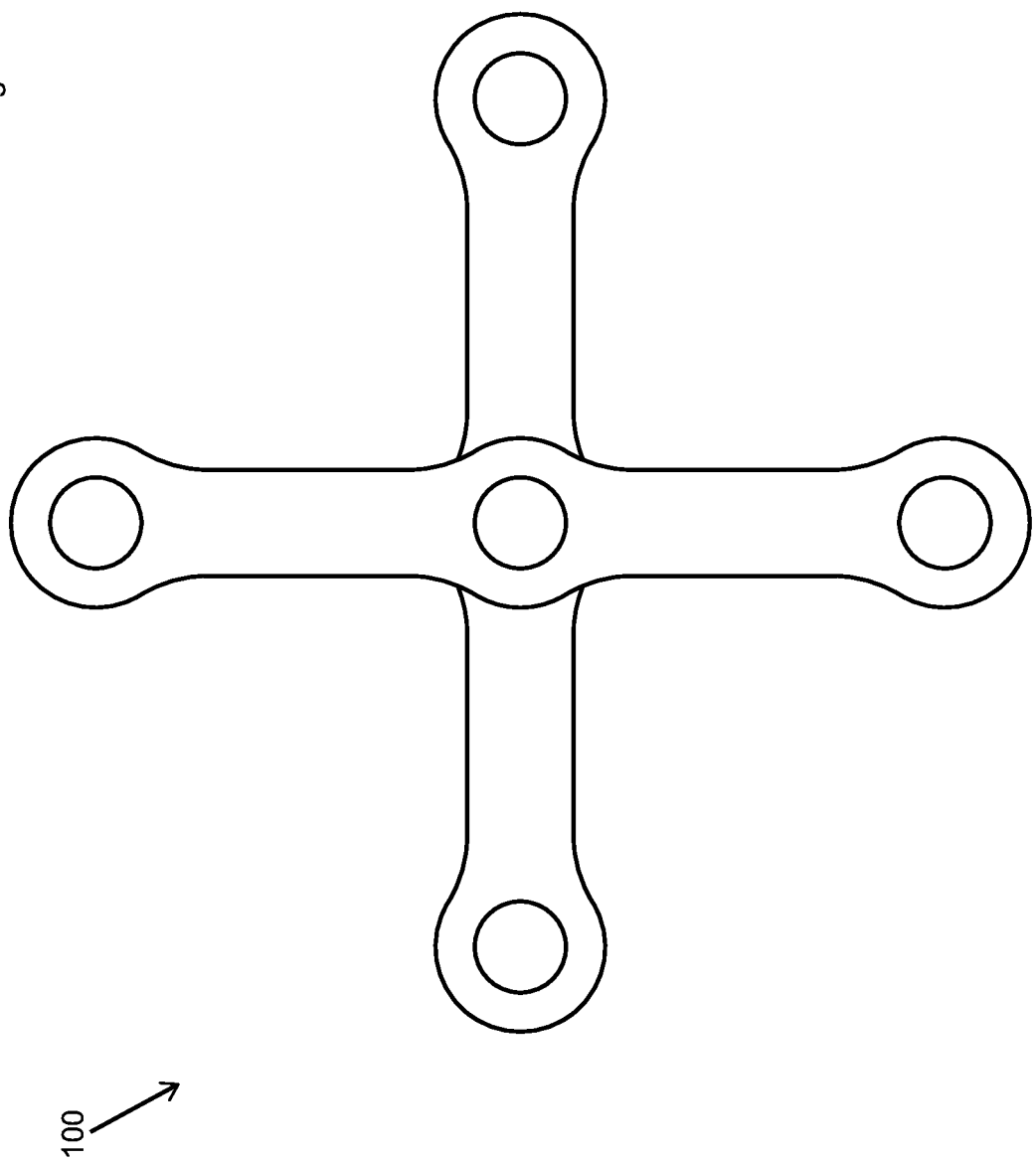
FIG. 7 is a top plan view showing how two struts of the dolly assembly of embodiment of FIGS. 1-4 could be attached together using a center to center joint combination.
Figure 8:
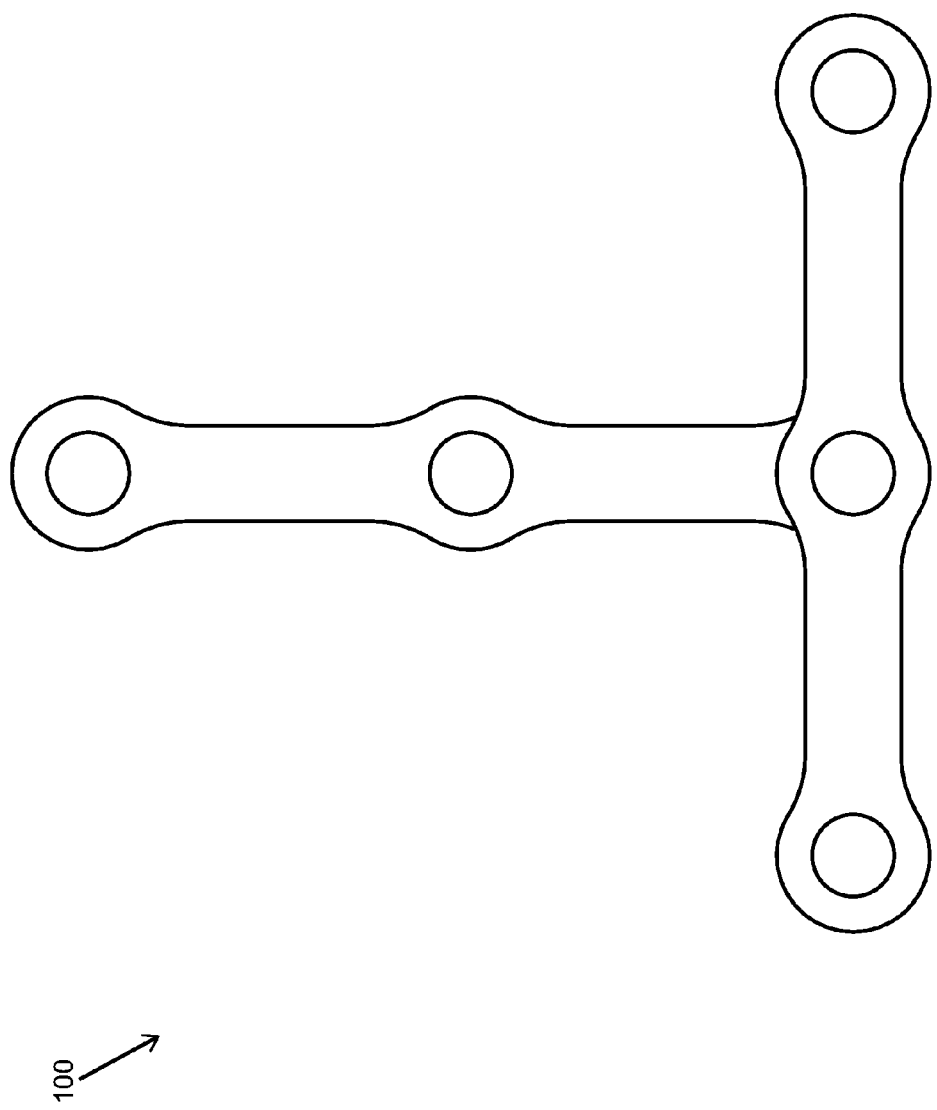
FIG. 8 is a top plan view showing how two struts of the dolly assembly of embodiment of FIGS. 1-4 could be attached together using center to edge joint combination.
Figure 9:
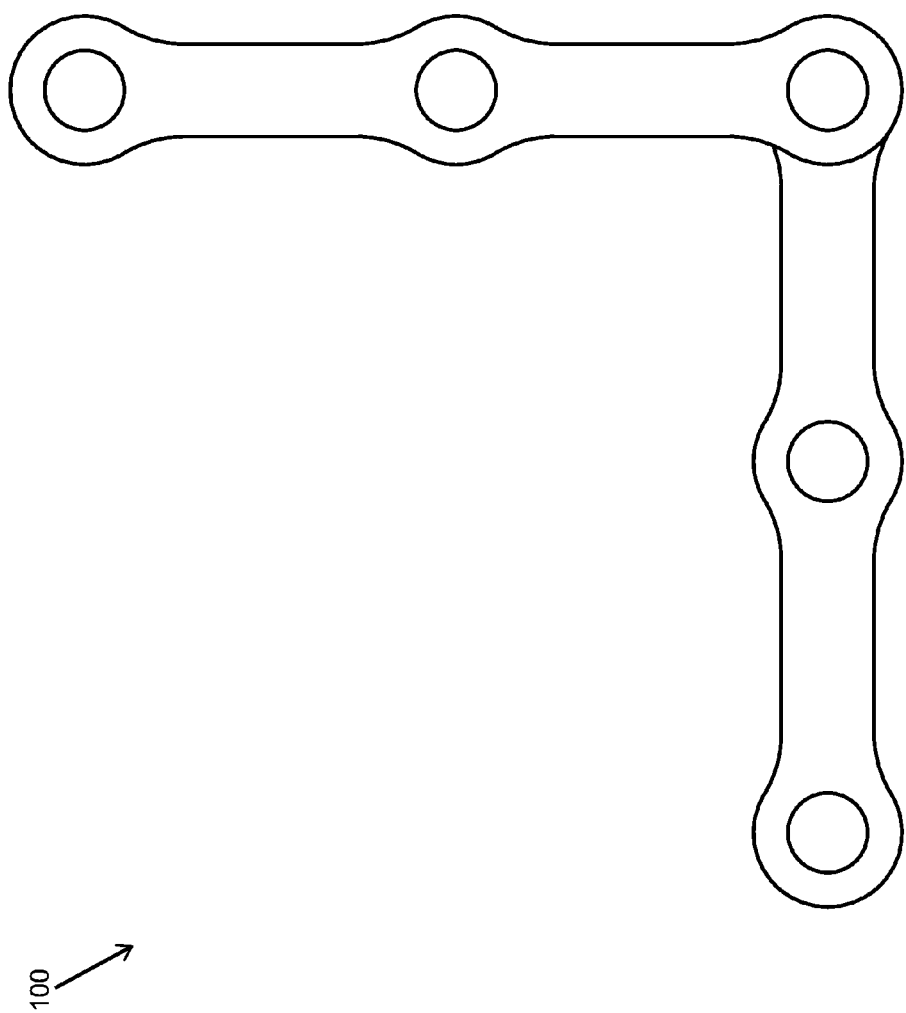
FIG. 9 is a top plan view showing how two struts of the dolly assembly of the embodiment of FIGS. 1-4 could be attached together using an edge to edge joint combination.
Figure 10:
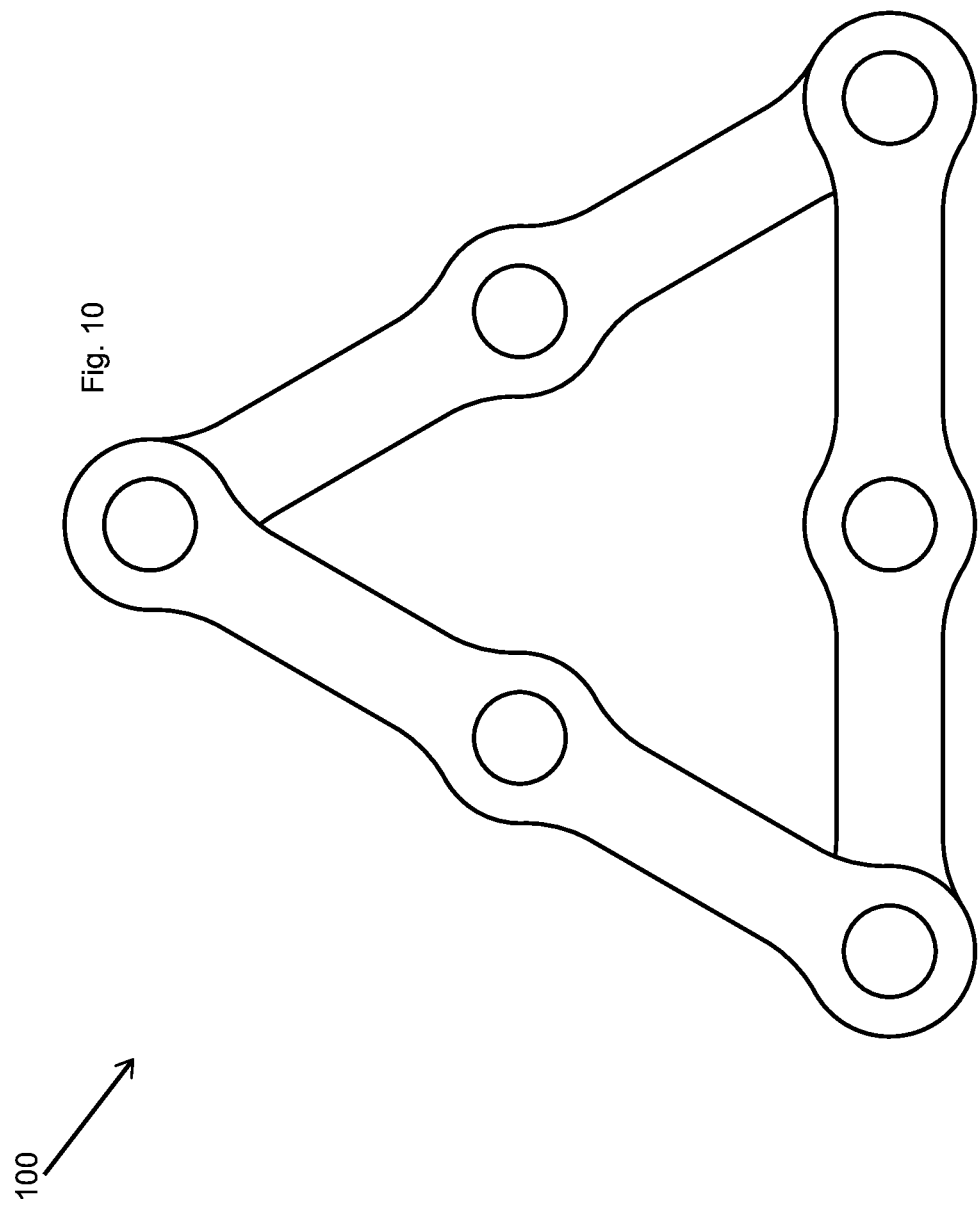
FIG. 10 is a top plan view showing how the unique struts of the dolly assembly of embodiment of FIGS. 1-4 can be attached together to form a triangular weight bearing surface.
Figure 12:
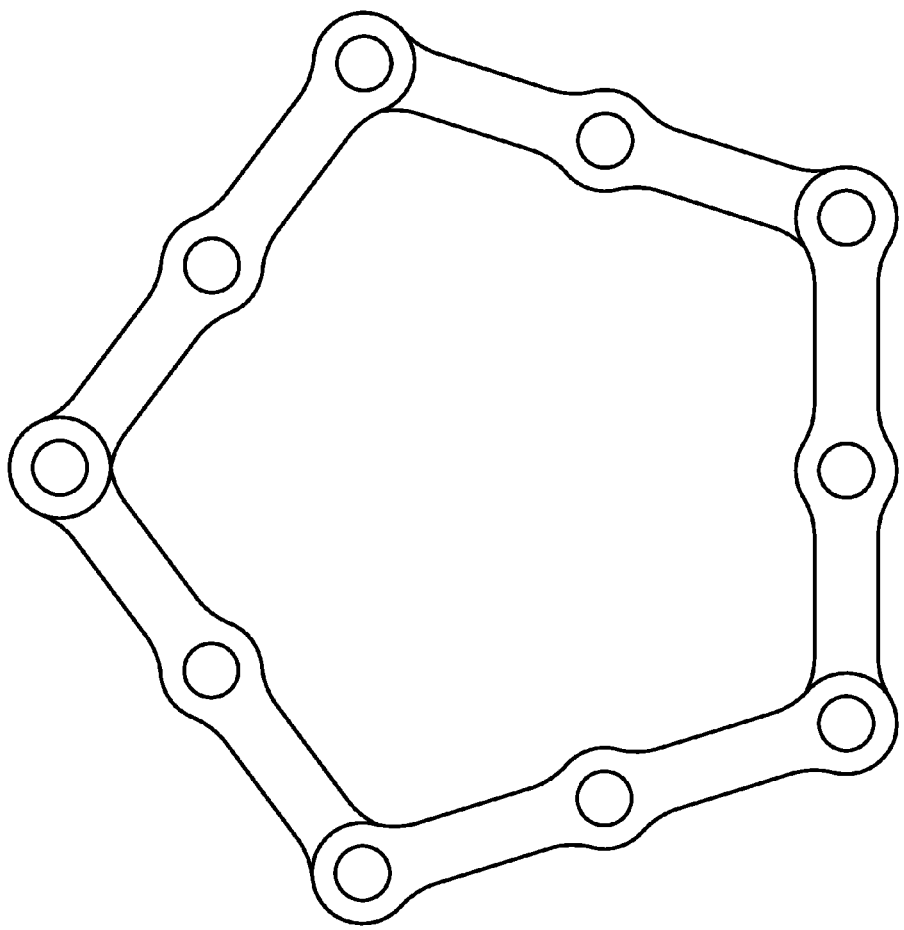
FIG. 12 is a top plan view showing how the unique struts of the dolly assembly of embodiment of FIGS. 1-4 can be attached together to form a pentagonal weight bearing surface.
Figure 13:
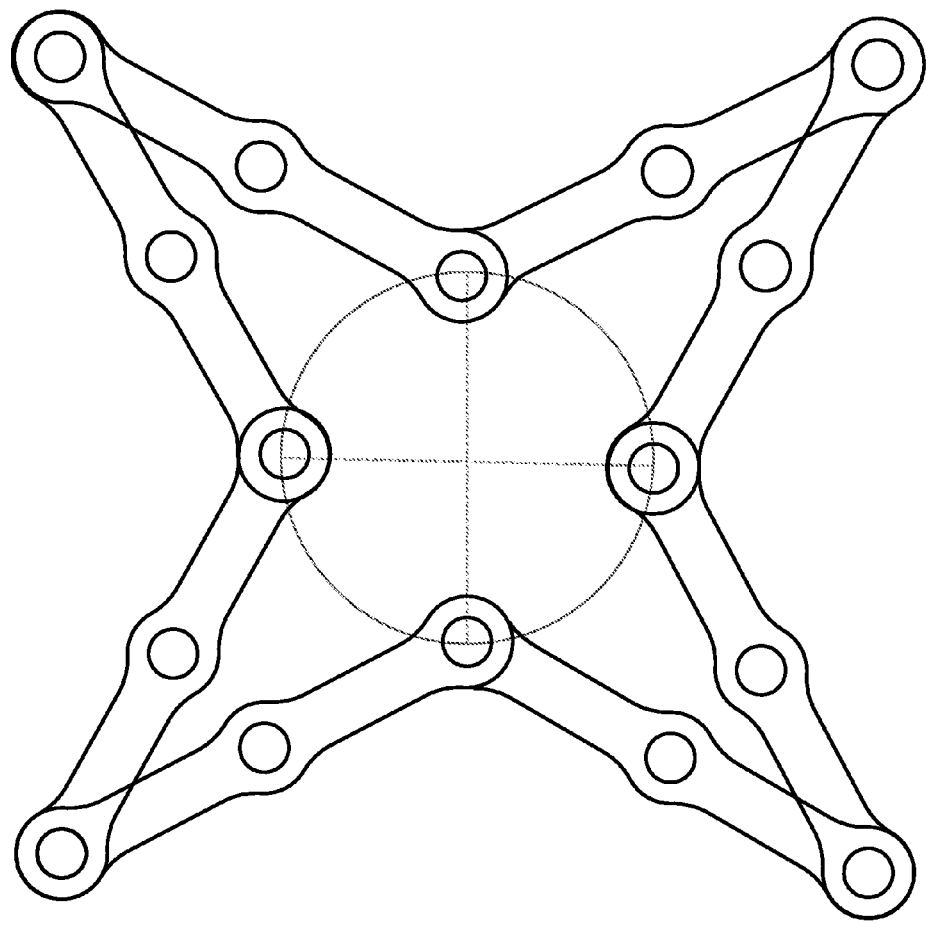
FIG. 13 is a top plan view showing how the unique struts of the dolly assembly of embodiment of FIGS. 1-4 can be attached together to form a star shaped weight bearing surface.
Figure 14:
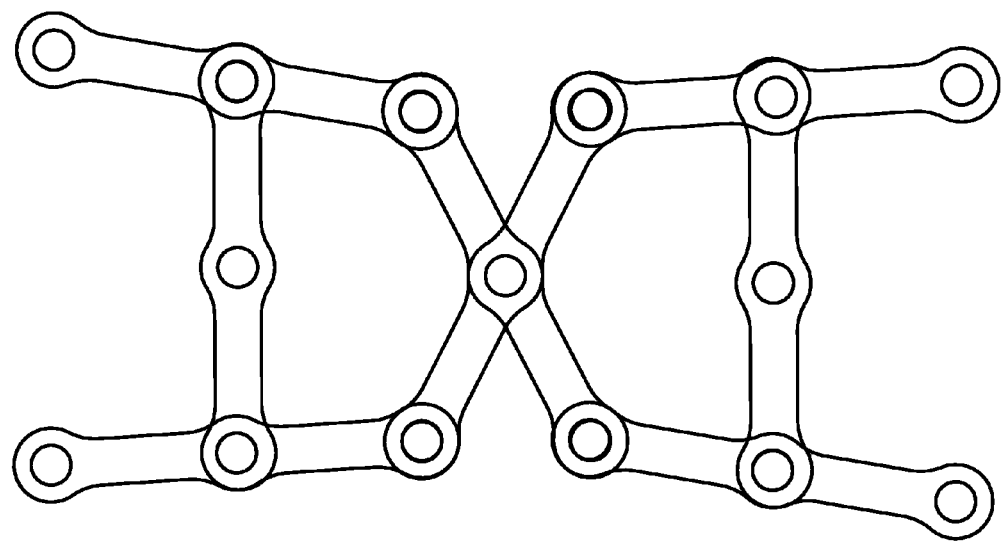
FIG. 14 is a top plan view showing how the unique struts of the dolly assembly of embodiment of FIGS. 1-4 can be attached together to form a irregularly shaped weight bearing surface, the view shows center to center, center to end, and end to end connections.

Additional structural features of the castor assembly or connecting assembly 15 are represented in more detail in FIGS. 2, 5 and 6. More specifically, the first connector 14A comprises a head portion, generally indicated as 114. The head portion 114 includes an enlarged head 115 and a fixedly or integrally attached body portion 117. In cooperation therewith, the second connector 14B includes a housing 114' having an enlarged end 118 which may also partially define a retaining portion. In addition, the housing 114' includes an at least partially hollow interior 120 cooperatively dimensioned and configured to receive and removably connect the body 117 within the interior 120, castor assembly 15 is in an operative position. The removable connection between the body 117 and the interior 120 of the housing may be accomplished by a threaded connection, friction fit, etc.

Figure 4:
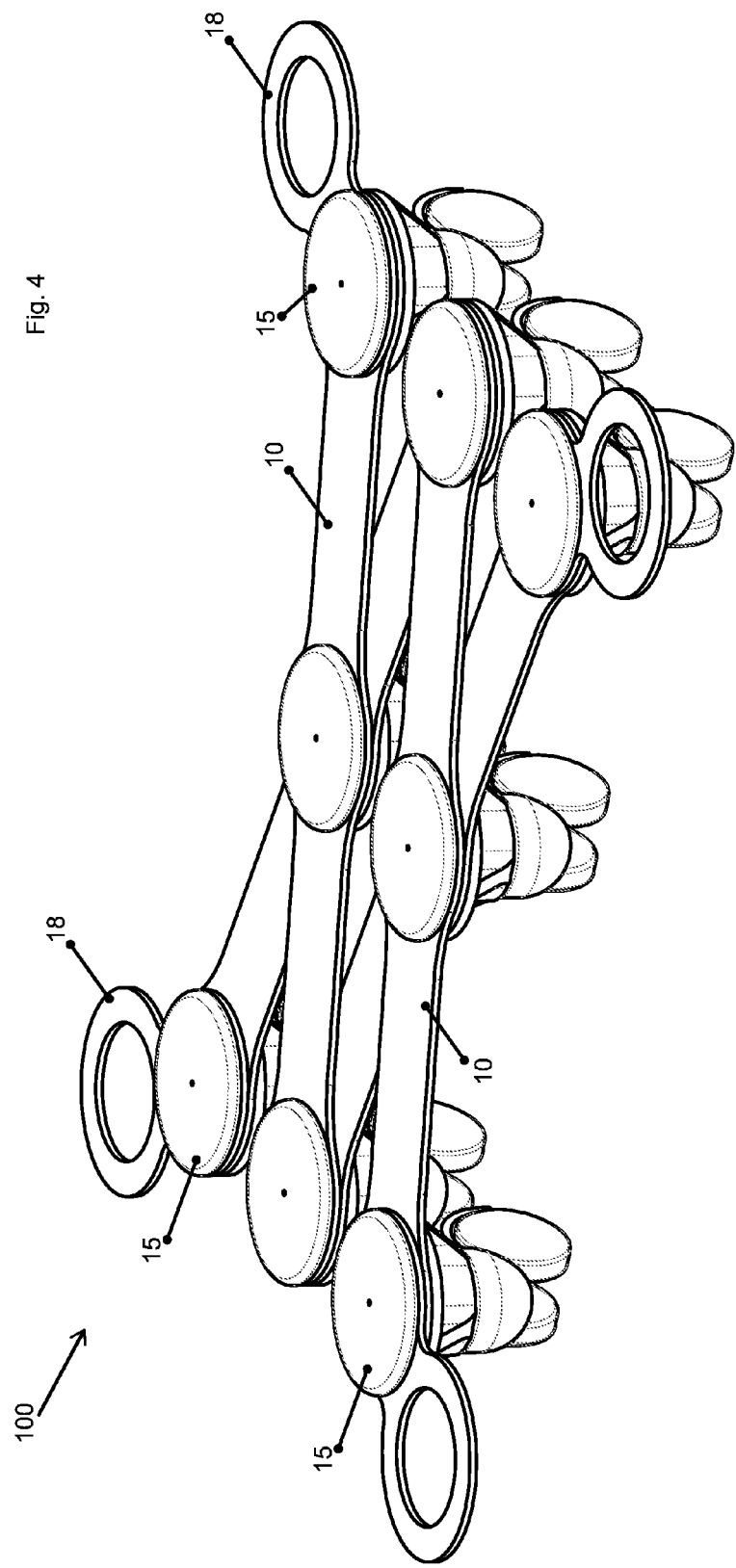
FIG. 4 is a perspective view showing the modular dolly assembly of the embodiment of FIG. 1-3 in a collapsed position comprising an accordion configuration.

Therefore, the head portion 114 and the housing 114' comprise and at least partially define a two piece construction of a base of the castor assembly and/or connecting assembly 15 as represented in FIGS. 2, 3 and 4. In addition a movable support, either in the form of a roller type castor structure 16 or in certain additional embodiments a roller ball of the type generally indicated as 50 in FIG. 16, can be inserted at least partially within the interior 120 of the housing 114 such as through the opposite end 122 relative to the enlarged end 118.

The aforementioned retaining portion of the castor assembly 15 may be defined by a cooperative positioning of the enlarged head 115 and the enlarged end 118 relative to a support platform such as, but not limited to modular strut(s) 10. As clearly represented in FIGS. 2, 5 and 6 a support platform such as, but not limited to, one or more of the modular struts 10 are effectively sandwiched between the undersurface 115' of the enlarged head 115 and the outer surface 118' of the enlarged end 118. In addition, the retaining portion may also comprise a recess 124 in which the support platform may be movably and/or pivotally disposed in order to facilitate pivotal, rotational or other movable relation of the support platform relative to the castor assembly 15, when in its operative position represented in FIGS. 2, 3 and 4.

More specifically, the operative position of the castor assembly and/or connecting assembly comprises the body 117 of the head portion 114 passing through appropriately disposed and dimensioned holes, such as 12, 13, etc. in a dolly or support platform, into the interior 120 of the housing 114'. In such an operative position the support platform including, but not limited to, the one or more modular struts 10 are removably but effectively sandwiched between the enlarged head 115 and the enlarged end 118, as set forth above. Therefore, the structure of the two piece castor assembly 15 allows it to be removably disposed in the aforementioned operative position with any of a plurality of different types of dolly structures or other support platforms by being passed or threaded through an appropriately disposed and structured hole, aperture, opening, passage, etc.

Yet additional structural features of the present invention are represented in FIG. 3. More specifically, the modular dolly assembly 100 further comprises at least one termination 18, each termination 18 defines two through holes 19, each termination 18 removably attaches to one of the struts 10 using one of the connector assemblies 14.

In a further embodiment of the present invention, when the first connector 14a and the second connector 14b are removably connected, they lock into place after at the struts 10 are arranged into a desired position.

In another preferred embodiment the termination members 18 are substantially planar.

In yet another embodiment of the present invention, the first 12, second 12, and third through holes 13 of each strut 10 are approximately of the same diameter.

As seen in FIGS. 7-15, the linearly planar struts may be joined together to form irregularly shaped collapsible configurations. A comparison of FIGS. 2, 3 and 4 clearly indicate that a positioning of the dolly assembly 100, from the operative position or orientation of FIG. 3 into the collapsed position or orientation of FIG. 4, involves the rotational or pivotal movement of each of the interconnected struts 10 relative to one another and about the longitudinal axis 20 of the interconnecting connector assemblies. More specifically, each interconnecting connector assembly comprises the first connector 14a positioned or threaded through aligned ones of the holes 13 in each of the connected struts 10 and thereafter being attached to the second connector 14b.

An advantage of the present invention is that it provides a dolly assembly that is collapsible.

Another advantage of the present invention is that it provides a dolly assembly that is manipulated into different shapes, thereby allowing users to transport oblong structures.

Yet another advantage of the present invention is that it provides a dolly assembly that is easily assembled.

A further advantage of the present invention is that it provides a dolly assembly that does not require tools to assemble.

Yet a further advantage of the present invention is that it provides a modular dolly assembly that can be enlarged or extended by the user by simply adding modules to the dolly.

Additional preferred embodiments of the present invention are represented in FIGS. 16 through 25 and include a one piece castor assembly generally indicated as 30. The versatility of the castor assembly 30 is evidenced by its ability to be used in either a first operative position or a second operative position.

Moreover, when in the first operative position the dolly assembly 30 can be used in combination with a variety of different dolly assemblies or other support platforms such as, but not limited to, the modular doll assembly 100 represented in FIGS. 1-15 and described in greater detail with reference to the dolly assembly 100', including a plurality of movably interconnected modular struts 10, as represented in FIGS. 20-25. A second operative position comprises the castor assembly 30 used separately and/or independently of any type of dolly structure or support platform. When used in the second operative position or orientation, one or more castor assemblies 30 are removably connected in supporting relation to one or more objects, so as to facilitate the movement of the supported object over any of a variety of different surfaces, without including any dolly structure or other support platform being connected to the castor assembly 30.

Accordingly, the castor assembly 30 comprises a one piece base 32 including a housing 34 having a substantially open interior and/or at least partially hollow interior 36. A first open end 38 disposed in direct communicating relation with the open interior 36. The one piece base 32 further includes a head 40 integrally or otherwise fixedly secured to an opposite or second end of the housing 34, as at 42. As represented through the Figures, the head 40 includes an overall enlarged dimension and/or configuration extending radially outward from the housing 34. As represented, the enlarged head includes a diameter or transverse dimension greater than the transverse dimension of the open end 38 or the transverse dimension of the housing 34, for reasons which will be apparent from the description of the structure and use of the castor assembly 30, herein provided.

The housing 34 of the castor assembly 30 may also comprise a plurality of housing segments 44 extending along the length thereof and preferably disposed in spaced relation to one another along at least a portion and/or at least a majority of their lengths. As represented this spaced relation of the housing segments 44 comprises separating channels 46 which may extend along the majority of the length of the housing segments 44 or in some embodiments along at least the entire length thereof. One end of each of the plurality of channels 46 terminate in a notch or cut out portion 46' formed in and/or extending through the head 40. The provision of the cut out or notched portions 46' may facilitate the expansion or flexible movement of the housing segments 44 relative to a remainder of the base, as explained in greater detail hereinafter, and/or may also facilitate the removal of the base 32 from the molding equipment from which it is formed. The plurality of housing segments 44 may vary in number, size and shape, but collectively serve to define at least a majority of the housing 44. Similarly, the dimension and configuration of each of the housing segments may vary as they extend from one end 44' adjacent to the head 40, to an opposite end 44" which collectively terminate at and at least partially defining the periphery of the open end 38.

When fully assembled, each of the castor assemblies 30 include a movable support preferably in the form of a roller ball 50 movably disposed within the open interior 36. The comparative sizes of the open interior 36 and the roller ball 50 is such that when assembled, at least a portion of the roller ball 50 extends outwardly from the open end 38. The roller ball 50 is thereby allowed to engage any of plurality of supporting surfaces during movement thereof and during movable support of any one or more objects, whether the castor assembly 30 in used in the first or second operative position. Further, in the first operative positions the object may be at least partially supported by the head 40 as well as any dolly structure or support platform to which the dolly assembly 30 is connected. When in the second orientation one or more of the dolly assemblies is/are disposed relative to the object to movably support it, as indicated in more detail hereinafter.

In order to movably retain the roller ball 50 within the open interior 56, inner surface portions of the open interior 36 of the housing 34 are dimensioned and configured to movably retain the roller ball therein. When the housing 34 comprises the plurality of housing segments 44, the open interior 36 comprises the interior surface portions 45 of each of the housing segments 44. As such, the interior surface portions 45 comprise an at least partially concave configuration as clearly represented in FIG. 18. As a result, the plurality of concave inner surfaces 45 collectively and at least partially correspond to the outer surface of the roller ball 50, at least to the extent of facilitating the rotation of the roller ball 50 while being retained within the open interior 36 and open end 38 of the housing 34.

Placement of the roller ball 50 and preferably removable retention thereof within the open interior 36 is facilitated by the expandable or flexible characteristics of the housing 34. Such flexibility is due at least in part to the structural features of the plurality of housing segments 44 and possibly the fact that the housing segments 44 may be at least partially formed from a flexible material. In either case, the plurality of housing segments may be temporarily expanded by being flexed substantially outwardly as the ball 50 is forced through the open end 38 into the open interior 36. As indicated, the diameter of the roller ball 50 is greater than the diameter of the open end 38. However, once removably retained within the open interior 36 the concave surfaces 45 of the plurality of housing segments 44 facilitate the rotation of the roller ball 50. In addition, the flexible characteristics of the housing segments 44 will serve to return them into an original, non-flexed orientation and in retaining relation to the roller ball 50 within the open interior 36.

As explained herein, the castor assembly 30 of the present invention has structural and operative features which significantly enhance its versatility and use. As such, the castor assembly 30 is structured for use in the first operative position, in combination with a support platform and/or dolly structure such as, but not limited to, the type of dolly assembly 100, as represented in the FIGS. 1 through 15 and as described in greater detail with regard to the dolly assembly 100' represented in FIGS. 20 through 25. Therefore, at least one embodiment of the castor assembly 30 includes a retaining portion generally indicated as 60, the retaining portion 60 comprises a recessed area disposed within the outer surface or outer portion of the housing 34 preferably intermediate the open end 38 and the head 40. In at least one preferred embodiment the recessed portion or the retaining portion 60 is formed immediately adjacent and/or contiguous to an under portion 40' of the head 40 so as to further facilitate the attachment and/or removable connection of the support platform which may include one or more modular struts 10 of the dolly assembly 100'. In more specific terms, the retaining portion 60 comprises a recess portion formed in the outer portion of the base 32, including the outer surface of the housing 34.

In the embodiment including housing 34 comprising the plurality of housing segments 44, the retaining portion 60 is at least partially defined by the recess being at least partially defined by a plurality of recess segments 64, each formed in a different one of the housing segments 44. As will be further demonstrated with reference to FIGS. 20 through 25, the placement of the support platform or dolly 100', such as one or more of the struts 10, within the recess segments 64 of the retaining portion 60 will serve to effectively sandwich the platform and/or struts 10 between the under surface or portion 40' of the head 40 and the correspondingly remainder of each of the plurality of housing segments 44.

A cooperative dimensioning of the retaining portion 60 with the portion of the dolly or support platform retained therein may be such to provide a relative pivotal and or at least partially rotational movement, about longitudinal axis 20', between the base 32 and the dolly or support platform retained in the retaining portion. This would facilitate the expansion or contraction of the dolly assembly 100' or 100, such as represented in FIGS. 3 and 4.

Further, the aforementioned flexible characteristics associated with the plurality of housing segments 44 will facilitate the passage of the housing 34, through an appropriately dimensioned hole or openings 12, 13 and/or aligned ones of the holes 12, 13, etc. Once the housing 34 passes through the one or more holes, as at 12, 13, etc. the roller ball 50 may be forced through the opening 38 and into the open interior 36 into movable, at least partially mating engagement with the concave interior surfaces 44'. Therefore, the head 40 will be located on an outer or exposed portion of the dolly assembly 100 while the open end 38 and the roller ball 50 will be located on the opposite side of the dolly assembly 30 including the one or more struts 10 as represented in FIGS. 20 through 25.

Figure 21:
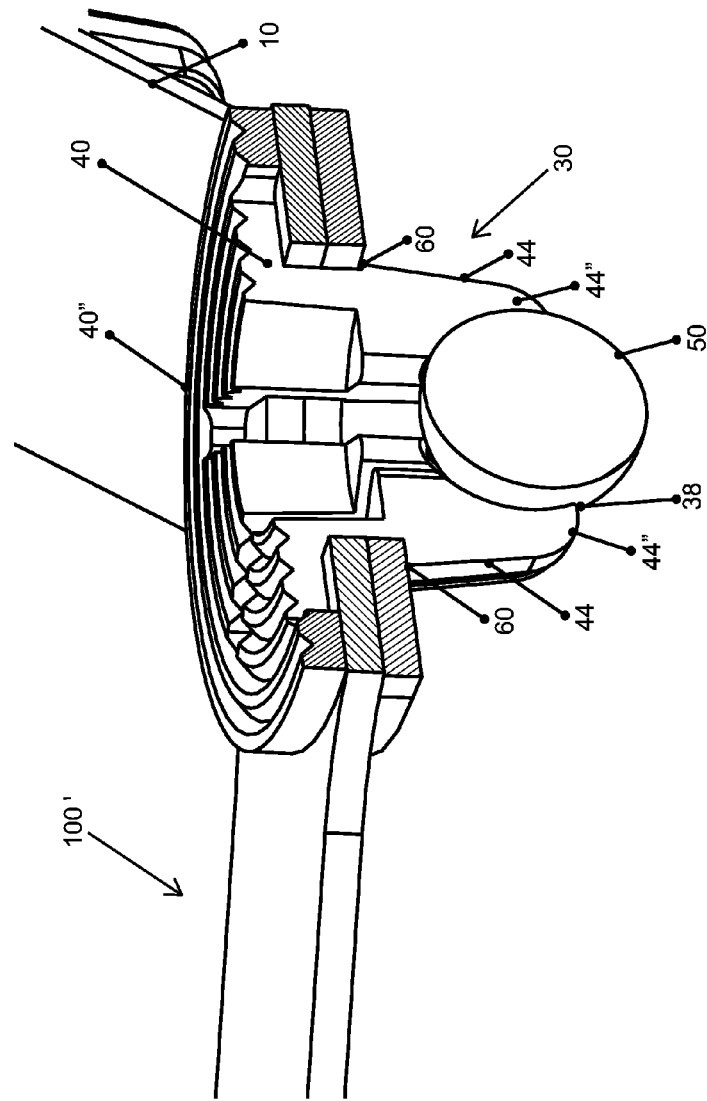
FIG. 21 is a perspective view and partial cut a way and section of the assembled castor assembly as represented in FIG. 20.
Figure 24:
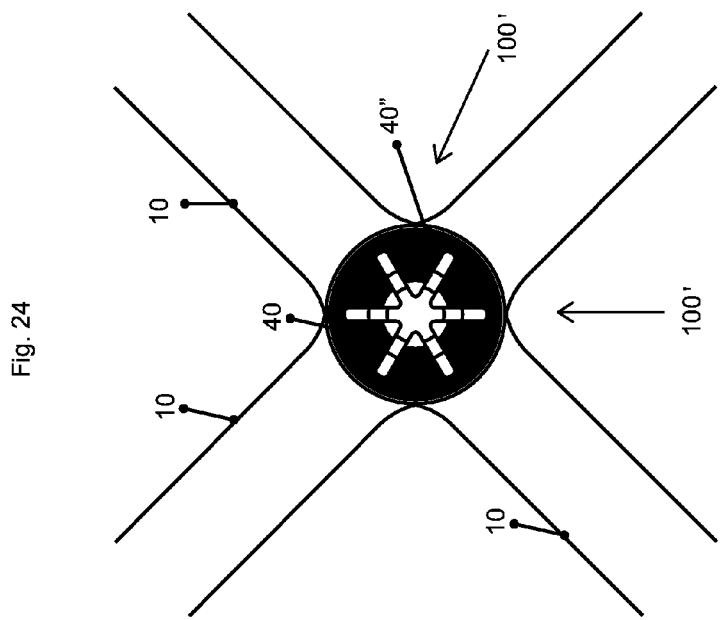
FIG. 24 is a bottom plan view and partial cut a way of the embodiment of FIGS. 22 and 23.
Figure 23:
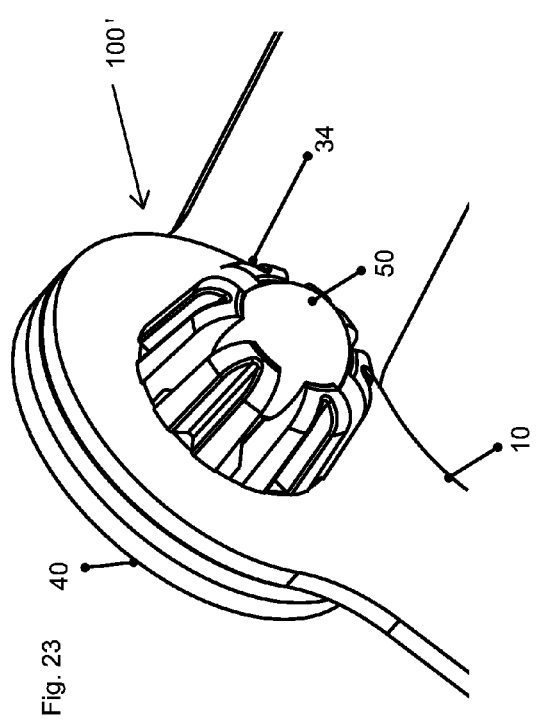
FIG. 23 is a bottom perspective view and partial cut a way of the embodiment of FIG. 22.
Figure 22:
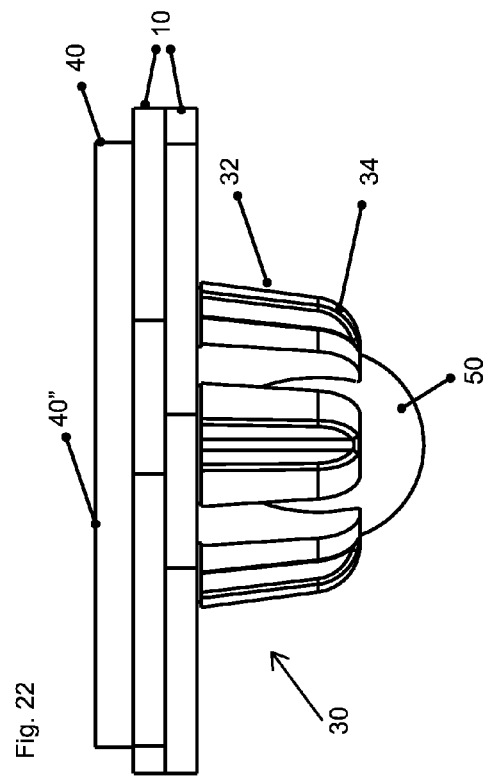
FIG. 22 is a side view and partial phantom of an assembled castor assembly as represented in FIGS. 16 through 21.
Figure 25:
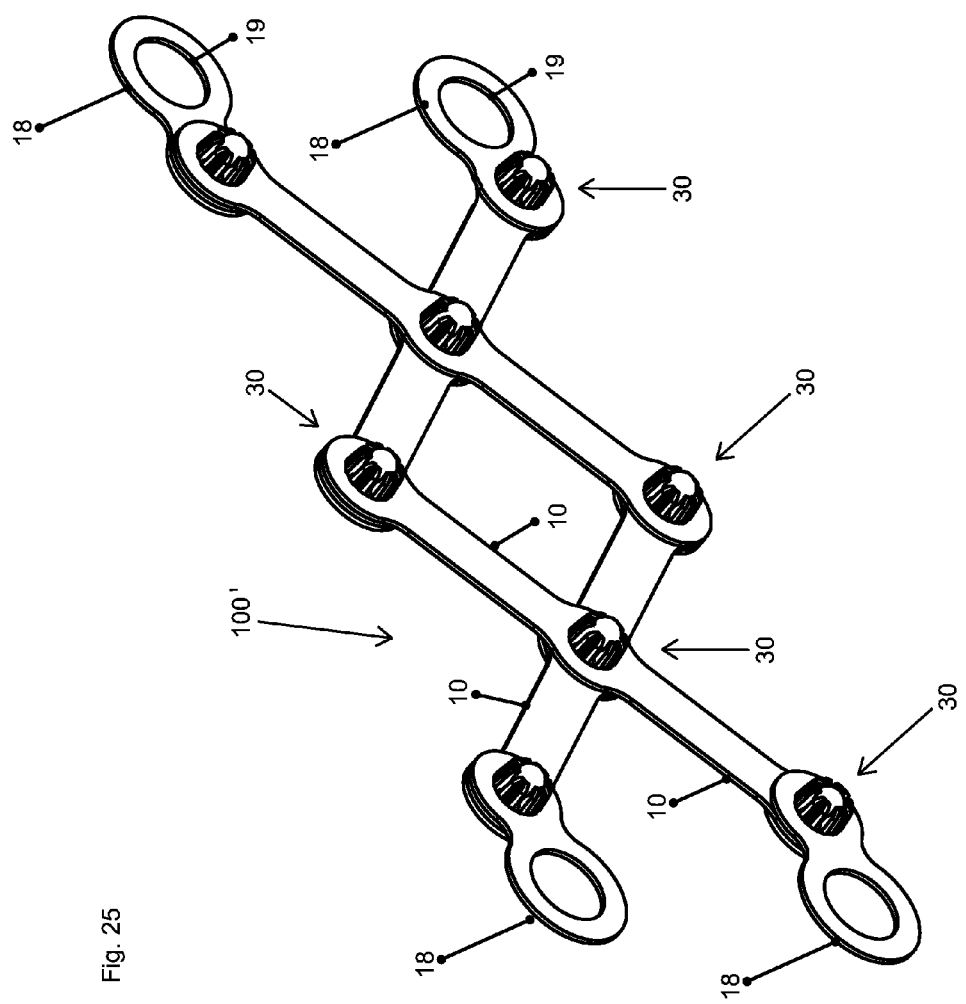
FIG. 25 is a perspective view of the castor assembly disposed in a first operative position for use in combination with a dolly assembly as represented in FIGS. 1 through 15.

With regard to FIG. 21, the outer surface of the head 40, as at 40" may be structured and or configured to facilitate engagement and/or attachment of the head 40 to any one or more objects being supported on the dolly assembly 40 and being concurrently and at least partially supported by the castor assembly 30. In more specific terms, the outer surface or portion 40" of the head 40 may be ribbed, may have an irregular surface configuration, and/or may have an adhesive coating or adhesive outer portion, in order to serve as a friction pad and prevent or at least restrict unintentional disconnection or detachment of the head 40 from the object being supported. Further, the outer portion 40" or at least other portions of the head 40 may be formed of a cushioning material to provide a reasonable amount of protection against surface damage to the supported object.

While the castor assembly 30 is represented for use in combination with a dolly assembly 100 including one or more modular struts 10, it is emphasized that the versatility of the dolly assembly 30, including the various structural features thereof, allow its use with a number of differently structured dollies and/or support platforms.

More specifically, any dolly structure or support platform may be attached to one or more castor assemblies 30 by passing at least a portion of the housing 34 through an appropriately dimensioned hole, opening, passage, aperture, etc. such that at least a portion of the platform is disposed within the retaining portion 60 comprising a recess or the recess segments 64. When in such a position, the under portion or under surface 40' of the head 40 will be disposed in confronting relation to an outer or exposed portion of the support platform, so as to define the first operative position of the castor assembly 30 as indicated above.

Figure 17:
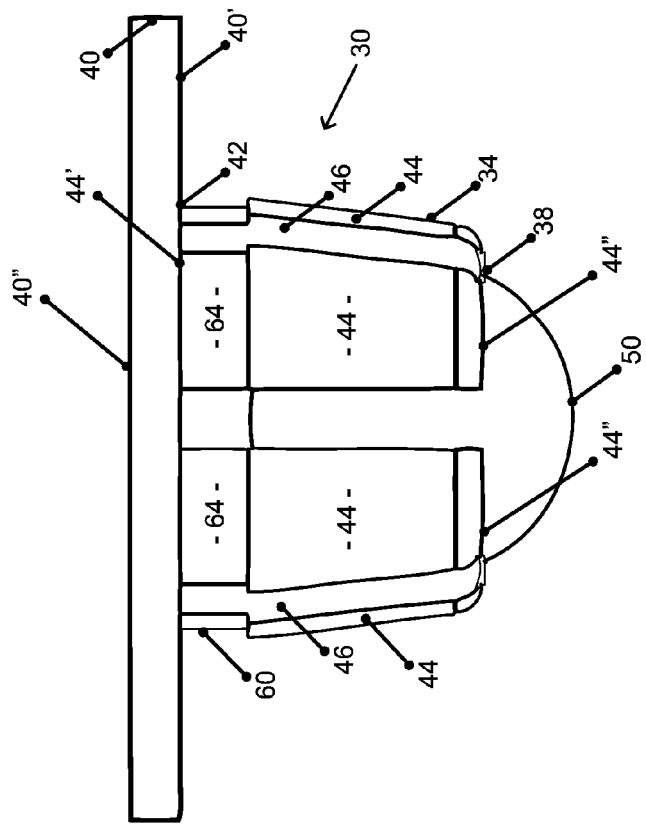
FIG. 17 is a side view of the embodiment of FIG. 16 in a second operative position.
Figure 16:
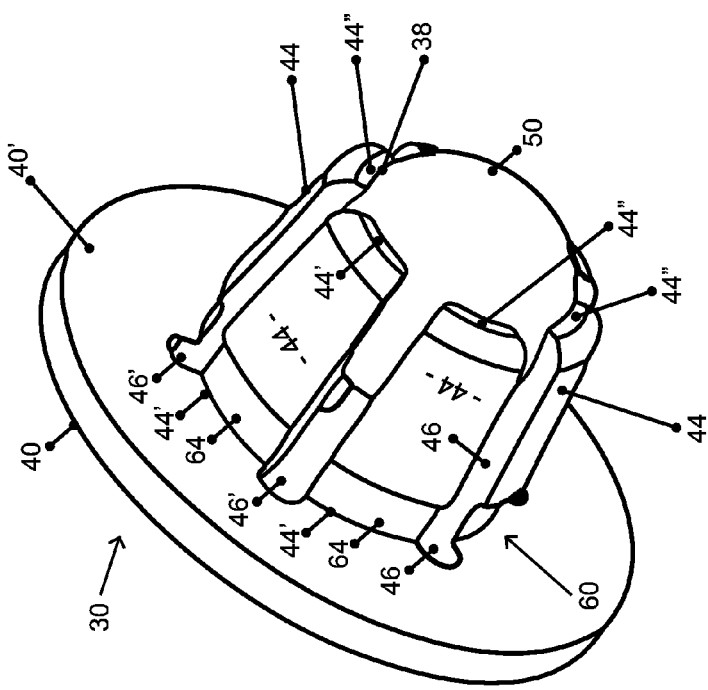
FIG. 16 is a perspective view of an additional preferred embodiment of a castor assembly of the present invention useable in combination with a dolly assembly or support platform or independently thereof.
Figure 18:
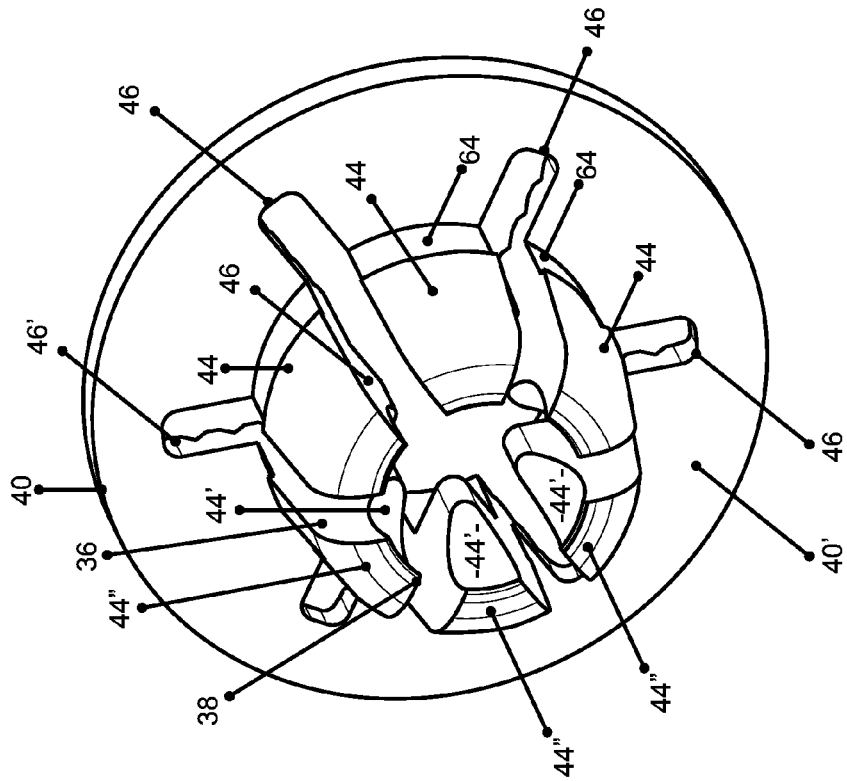
FIG. 18 is a bottom perspective view of the embodiment of FIGS. 16 and 17.
Figure 19:
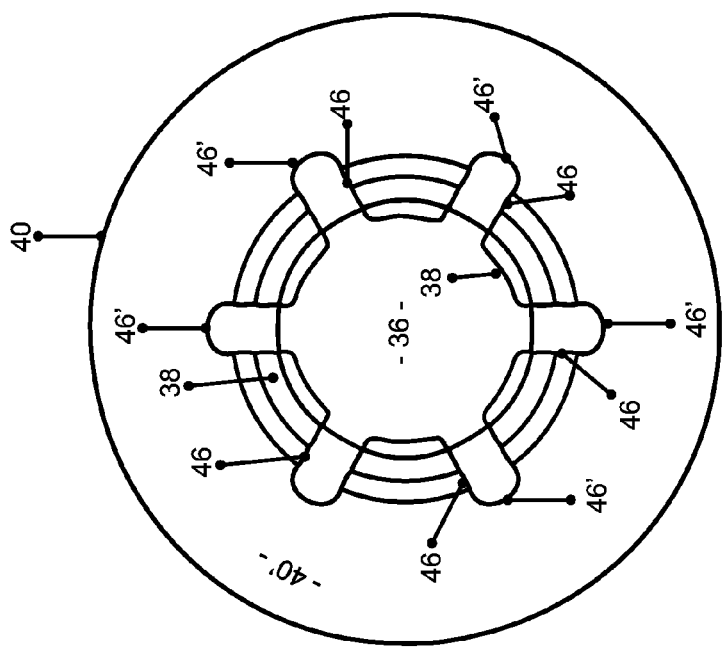
FIG. 19 is a bottom plan view of the embodiment of FIGS. 16 through 18.
Figure 20:
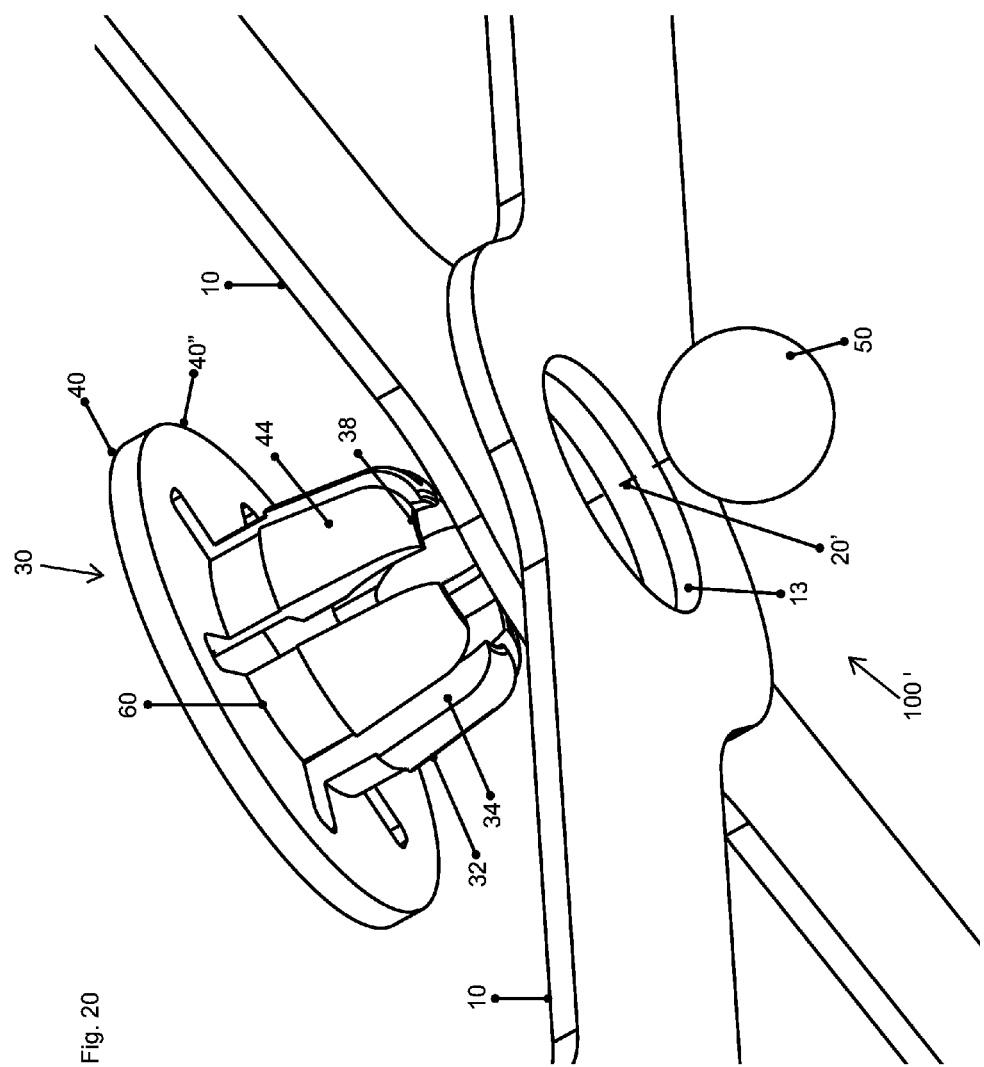
FIG. 20 is a perspective view in exploded form of the embodiment of FIGS. 16 through 19 in an at least partially disassembled form and positioned to be connected to a dolly assembly of the type described in FIGS. 1 through 15.

However, the second operative position of the castor assembly 30 is represented in FIGS. 16 and 17 and comprises its use independent of any attachment or connection to any type of support platform or dolly assembly such as in the first operative position as represented in FIGS. 20-25. Accordingly, when used in the second operative position, independently of its connection to any type of support platform or dolly assembly, a structural modification of the castor assembly 30 may comprise the absence of the retaining portion 60. However, for purposes standardization in the manufacture and design, and in order to enhance the versatility of the castor assembly 30, the retaining portion 60 may be included in each of the castor assemblies 30. As indicated, this will enable its use in combination with or independently of an attached support platform and/or dolly assembly, such as, but not limited to dolly assembly 100, 100', etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A castor assembly structured to at least partially support an object, said castor assembly comprising:
    a one piece base including a head and a housing fixedly attached to said base,
    a roller ball movably connected to said housing,
    said housing including an at least partially open interior and a first open end cooperatively dimensioned to movably retain and at least partially enclose said roller ball therein,
    said head connected to a second end of said housing and extending radially outward therefrom beyond an exterior surface of said housing, and
    said housing including a plurality of housing segments collectively disposed and structured to at least partially define boundaries of said open interior and removably retain said roller ball within said open interior.

2. A castor assembly as recited in claim 1 wherein said plurality of housing segments are flexibly attached to said head and extend outwardly therefrom towards said first open end.

3. A castor assembly as recited in claim 2 wherein said plurality of housing segments are collectively disposed in surrounding relation to said open interior and include free ends terminating at and at least partially defining a periphery of said open end.

4. A castor assembly as recited in claim 3 wherein adjacent ones of said plurality of housings segments are disposed in spaced relation to one another along at least a portion of their respective lengths.

5. A castor assembly as recited in claim 2 wherein each of said housing segments includes an interior surface having an at least partially concave configuration, said interior surfaces at least partially defining said open interior and said concave configurations collectively and at least partially corresponding to an outer surface of said roller ball.

6. A castor assembly as recited in claim 1 further comprising a retaining portion disposed on said base intermediate said head and said first open end, said retaining portion structured to secure a support platform to said base.

7. A castor assembly as recited in claim 6 wherein said retaining portion is disposed on said exterior surface of said housing adjacent an under portion of said head; said head and said retaining portion cooperatively disposed and structured to retain the support platform on an exterior of said base in confronting relation to said under portion of said head.

8. A castor assembly as recited in claim 7 wherein said retaining portion comprises a recess formed in said exterior surface of said housing, said recess dimensioned to receive and removably retain the support platform therein.

9. A castor assembly as recited in claim 6 wherein said housing comprises a plurality of housing segments having one end connected to said head and an opposite end terminating at and at least partially defining a periphery of said first open end.

10. A castor assembly as recited in claim 9 wherein said retaining portion comprises a plurality of recess segments each formed in an exterior surface of a different one of said housing segments, said plurality of recess segments collectively dimensioned and disposed to removably receive and movably retain the support platform on said base.

11. A castor assembly as recited in claim 1 wherein said head is disposable in confronting at least partially supporting relation to the object when in an operative position.

12. A castor assembly as recited in claim 11 wherein said head comprises an outer surface configured and structured to at least temporarily maintain said confronting, at least partially supporting relation of said head with the object.

13. A castor assembly structured for use in combination with or independently of a support platform, said castor assembly comprising:
    a one piece base including a housing and a head integrally connected to one end of said housing,
    said housing including an open interior and an open end disposed in communicating relation to said open interior at an opposite end of said housing relative to said head,
    a roller ball disposed within said open interior and at least partially extending outwardly therefrom through said open end,
    a retaining portion formed on said base intermediate said head and said open end, said retaining portion and said head cooperatively disposed and structured to collectively and removably secure said base to the support platform when in a first operative position,
    said first operative position further comprising said base extending through the support platform and said head and said open end disposed on opposite sides of the support platform, and
    said base disposable in a second operative position comprising said head disposed in confronting, at least partially supporting relation to an object, when said base is not secured to the support platform.

14. A castor assembly as recited in claim 13 wherein said housing comprises a plurality of housing segments disposed in spaced relation to one another and each having an outer end terminating at and at least partially defining a periphery of said open end; each of said housing segments including an interior surface having an at least partially concave configuration; said interior surfaces at least partially defining said open interior and said concave configurations collectively and at least partially corresponding to an outer surface of said roller ball.

15. A castor assembly as recited in claim 13 wherein said retaining portion comprises a recess formed in an exterior surface of said housing, said recess dimensioned to receive the support platform therein, said recess and said head cooperatively disposed on said base to collectively retain the support platform on said base.

16. A castor assembly as recited in claim 13 wherein said first operative position and said second operative position comprise said head disposable in at least partially supporting relation to the object being supported; said head extending radially outward from said housing and beyond an exterior surface thereof, said head comprising an outer surface portion structured to restrict removal of a supported object from said confronting, at least partially supporting relation with said head.

17. A castor assembly as recited in claim 13 wherein said first operative position further comprises said base extending through the support platform concurrently to an under portion of said head disposed in abutting, confronting relation with an outer portion of the support platform and said roller ball and said head being located on opposite sides of the support platform.

18. A castor assembly as recited in claim 13 wherein said retaining portion is dimensioned and structured to movably connect the support platform to said base, when said base is in said first operative position.

19. A castor assembly attachable to a support platform and structured to at least partially support an object, said castor assembly comprising:
- a base including a head portion and a housing removably connected to one another,
- said head portion including a head and a body fixedly connected to said head,
- said head having a greater diameter than a transverse dimension of said body and extending radially outward therefrom,
- a retaining portion at least partially formed on said body adjacent said head, said retaining portion and said head cooperatively structured to removably retain the support platform connected to said base when said head portion and said housing are connected to one another,
- said base removably disposed in an operative position on the support platform; and said operative position comprising said head portion passing through the support platform into removable connection with said housing and said head and said housing concurrently disposed on opposite sides of the support platform, and
- a movable support attached to said housing in supporting relation to said base.

20. A castor assembly as recited in claim 19 wherein said removable connection of said head portion comprises said body passing through the support platform and at least partially disposed within an interior of said housing into removable attachment with said interior of said housing.

* * * * *